United States Patent [19]

Collins

[11] Patent Number: 4,630,656
[45] Date of Patent: Dec. 23, 1986

[54] ROUTER ATTACHMENT

[76] Inventor: J. W. Collins, 412 Bristle Cone La., Naples, Fla. 33962

[21] Appl. No.: 743,022

[22] Filed: Jun. 10, 1985

[51] Int. Cl.$^4$ .............................................. B27C 5/10
[52] U.S. Cl. .................. 144/134 D; 83/574; 144/136 C; 409/182
[58] Field of Search .................. 144/134 D, 136 C; 409/182, 185, 214, 215, 218; 408/115 R; 83/574

[56] References Cited

U.S. PATENT DOCUMENTS

| | | | |
|---|---|---|---|
| 2,957,507 | 10/1960 | Vargo | 144/144.5 |
| 4,155,383 | 5/1979 | Welliver | 144/134 D |
| 4,281,694 | 8/1981 | Gorman | 144/134 D |
| 4,320,678 | 3/1982 | Volk | 83/574 |

Primary Examiner—W. D. Bray
Attorney, Agent, or Firm—Harry W. Barron

[57] ABSTRACT

A router attachment assembly is described herein which includes a pair of guide rails between which a router carriage assembly moves. A router is attached within the carriage assembly and the assembly includes mechanisms for lowering and raising the router carriage assembly to allow the router to perform desired cuts on a workpiece positioned beneath the guide rails. The carriage assembly itself rides directly on workpiece and is guided by the guide rails. Front stop and back stop means are included which can limit the movement of the carriage assembly along the guide rails to desired positions. The stop means further includes vertical edges against which the carriage assembly rests to cause the raising and lowering of the router to be perfectly vertical. The attachment further includes a pair of clamping rails positioned below the rails to clamp the workpiece in position or to define a path for moving the workpiece relative to a stationary positioned router. Further, the attachment includes circle and pattern cutting means, including a pin inserted into a receiver flushly mounted in the work table. For performing circular cuts, the router is positioned at the radius distance away from the pin and the workpiece is rotated around the pin. For performing pattern cuts, the router bit is positioned directly above a guide extending from the pin and a pattern is attached to the workpiece and moved against the guide. A pair of rulers are provided along the length of the router attachment and along the rails to precisely position either the router or the workpiece.

20 Claims, 13 Drawing Figures

ROUTER ATTACHMENT

This invention relates to a multi purpose router attachment and more particularly to such an attachment which permits an electric router to perform multiple work tasks on a workpiece in a very accurate and predetermined fashion.

The router is a common tool used in many workshops. This tool commonly is used to make designed edges on wood or to cut grooves in wood for the purpose of attaching other pieces of wood in a hidden edge fashion. The router is simply a high speed motor to which a wood cutting bit is attached to the shaft. As the bit turns at an extremely high rpm rate, such as 20,000 rpm, the router is moved across the wood and causes a very smooth and professional looking cut to be left behind on the wood.

One of the major problems in using a router, particularly for an inexperienced user, is that any slight movement of the machine itself will leave a mark in the final cut. For example, in using the router in a traditional manner by moving it along the edge of a board, a small bounce up or down or inward or outward push toward the board will leave an uneven and wavy area on the cut. Even the most experienced workmen has difficulty in getting professional quality router cuts. To solve this problem special and more expensive bits have been developed having edge guide pilots to allow the operator to more accurately follow the edge of the wood. In addition, routing attachments have been developed which guide the router in a precise straight line. These attachments typically are affixed to the workpiece and the router is pressed against the edge formed by the attachment to maintain the router in a straight line.

In addition to simply cutting straight lines, the router is also useful for cutting curved lines or making other types of designs. In order to do this a pattern is created and the router follows the pattern around the wood piece to cut the desired design. Routers are also useful for shaping, forming circular workpieces, and cutting a variety of different types of joints in wood pieces. In each instance special attachments have been developed to allow the router to cut the desired shape or type of joint in a precise and accurate fashion. However, most of the attachments of the prior art have been limited to a single function or a few functions. No single attachment has been developed which allows the maximum utilization of the router for multiple applications.

An example of the special types of attachments developed in the prior art is shown in U.S. Pat. No. 4,434,824 to Bussey, U.S. Pat. No. 4,185,671 to Cotton, U.S. Pat. No. 3,985,168 to Lundquist, U.S. Pat. No. 3,540,130 to French and U.S. Pat. No. 3,450,001 to Fortune. In the Fortune U.S. Pat. No. 3,450,001, for example, a guide means is described which allows the router to make a straight cut on a piece of wood. The Fortune device however has limited applicability as a general purpose router attachment. Further, even for the purpose for which it was designed, it is not entirely satisfactory because the workpiece being cut is positioned above the attachment rather than below the attachment on a work table. Further, the router itself is forced to ride in the attachment rather than directly on the wood causing potential jamming problems and inaccuracy of cuts due to misalignment of the attachment. In order to overcome many of the shortcomings of devices such as the Fortune device, extremely complex attachments have been developed such as described in U.S. Pat. No. 4,185,671 to Cotton. Again the Cotton router attachment is very limited in applicability to merely designs in wood panels. Similarly, each of the other attachments, have very limited use.

In accordance with one aspect of this invention there is provided a router attachment for controlling the operation of a router on a workpiece. The attachment comprises a guide means beneath which the workpiece is positioned and carriage means for holding the router. The carriage means moves along the path defined by the guide means as a router operates on the workpiece. In addition, the attachment includes means for raising and lowering the carriage means above the workpiece when the router is not operating on the workpiece and for lowering the carriage means in contact with the workpiece when the router is to operate upon the workpiece.

A preferred embodiment of the subject invention is hereafter described with specific reference being made to the following Figures, in which.

Figure 1:
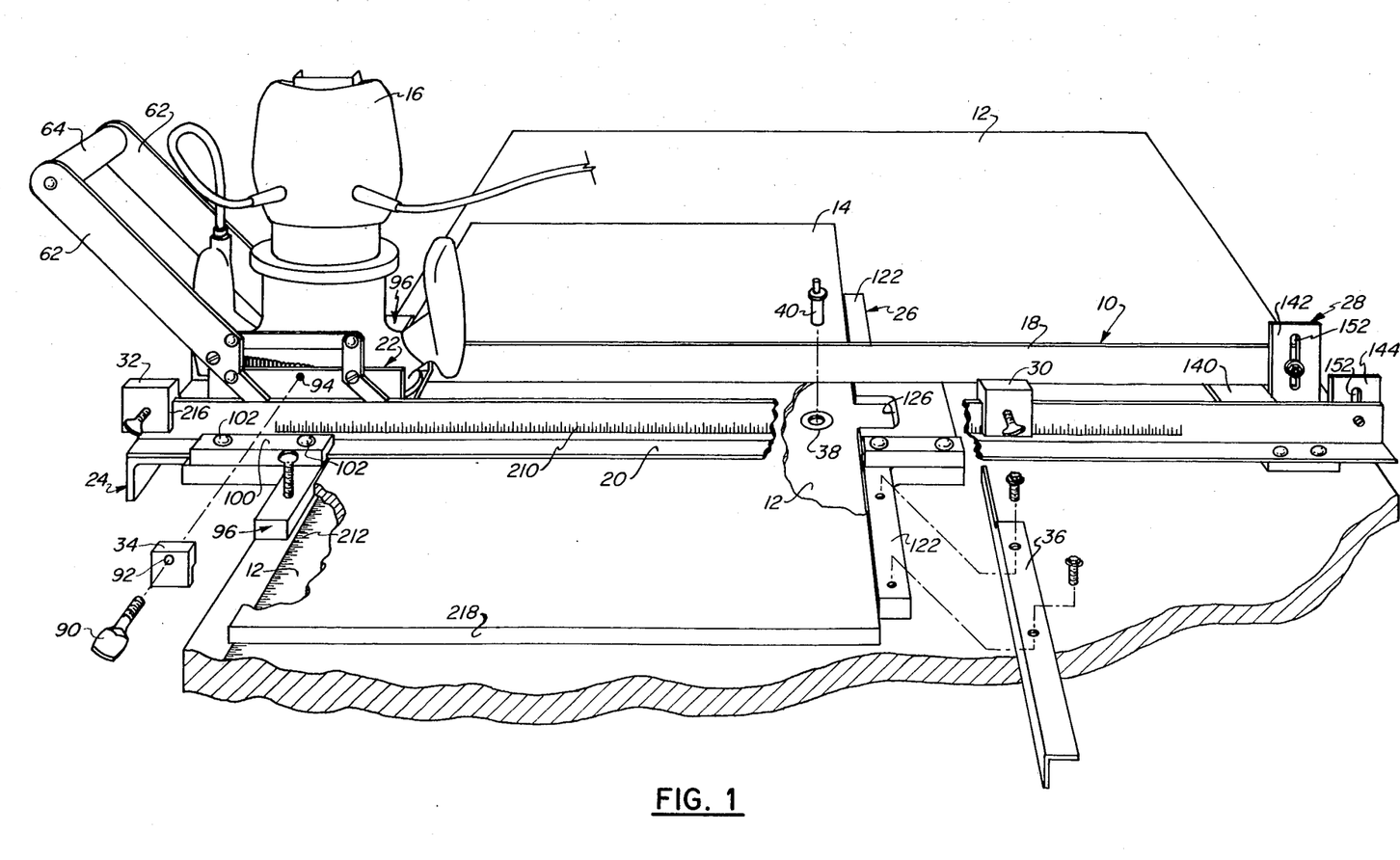
FIG. 1 shows an isometric view of the router attachment.

Referring now to FIG. 1, router attachment 10 is shown attached to a work table 12. A workpiece 14 is placed on table 12 and beneath the operative portion of attachment 10 so that router 16 can operate on workpiece 14. Router attachment 10 includes left guide rail 18, right guide rail 20, router carriage assembly 22 for holding router 16, home clamping bar assembly 24, adjustable clamping bar 26 and attachment connector assembly 28. In addition, a front stop 30 and back stop 32 can be connected to right guide rail 20 to limit the forward and backward movement of carriage assembly 22 and control its vertical movement. A carriage clamp 34 may be attached to carriage assembly 22 to hold carriage assembly 22 in a fixed position if desired. Other additions to the general router attachment include a jointing extension bar 36 which may be secured to adjustable bar assembly 26 and a circle/pattern shaping pin holder 38, which may be secured flush with the surface of work table 12 and adapted to receive a circle cutting pin 40 or a pattern pin of proper size when used for pin routing (not shown in FIG. 1).

Figure 2:
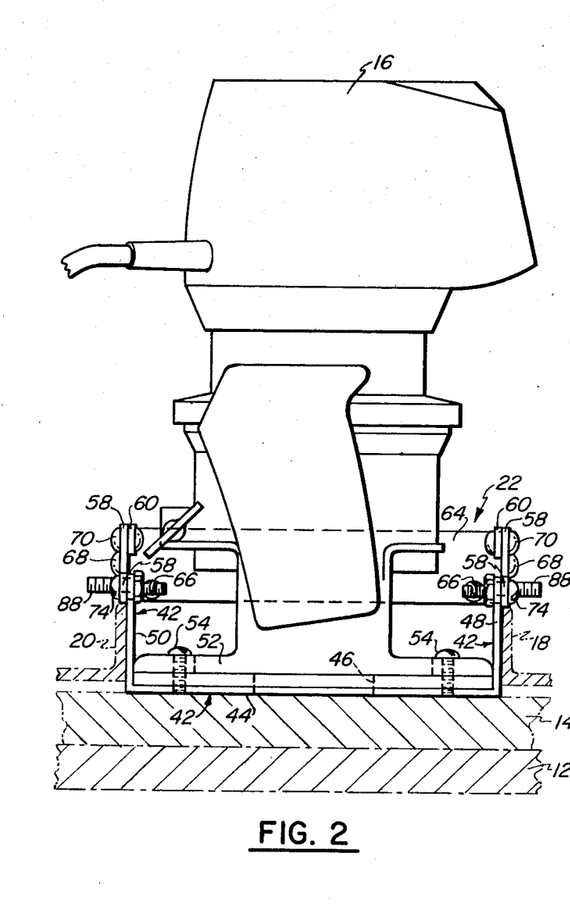
FIG. 2 shows a back view of the router positioned in the carriage when the carriage is in the down position.
Figure 3:
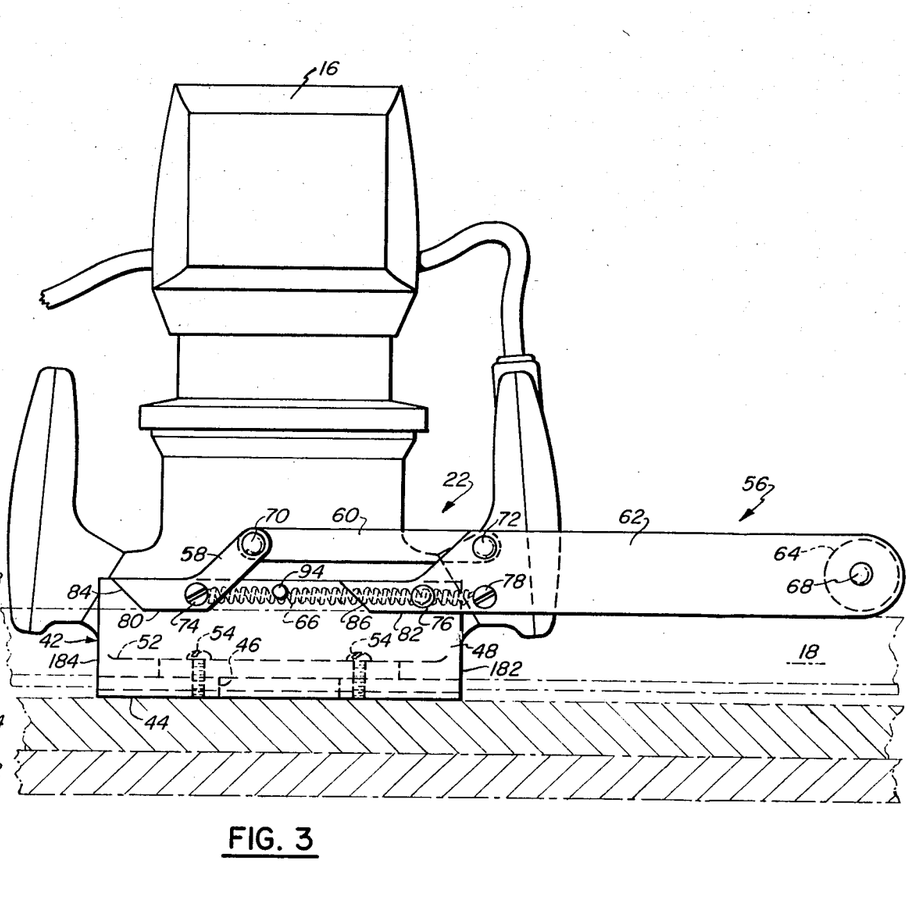
FIG. 3 shows a left side view of the router positioned in the carriage when the carriage is in the down position.
Figure 4:
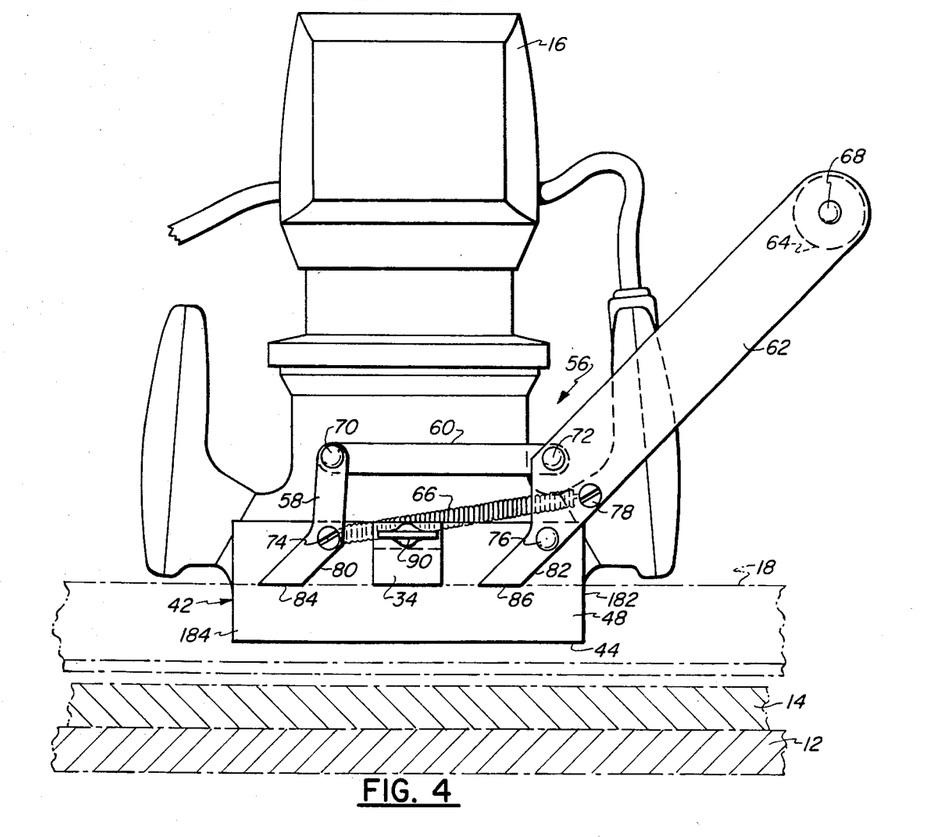
FIG. 4 shows a left side view of the router positioned in the carriage when the carriage is in the up position.
Figure 5:
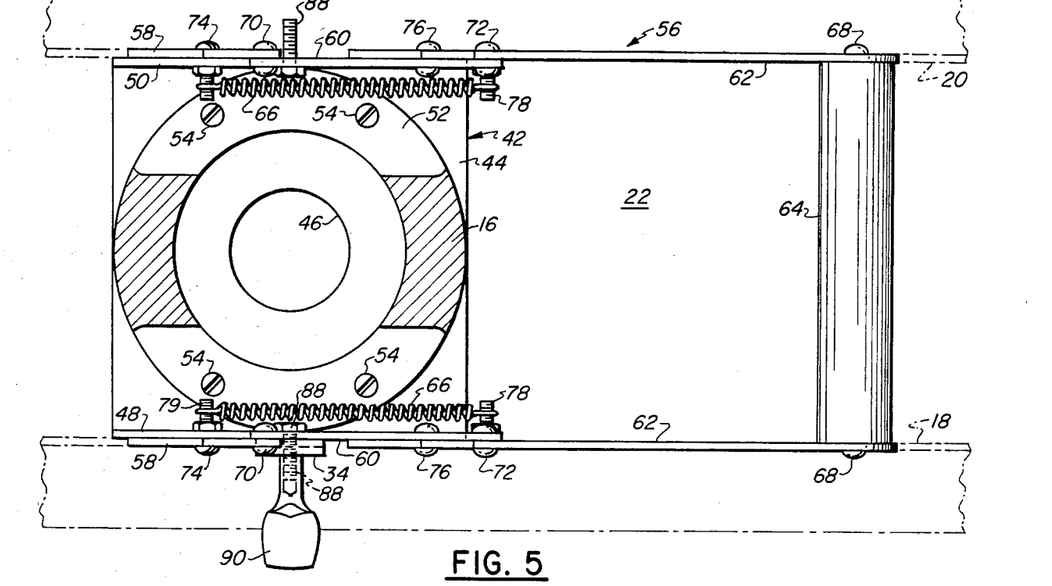
FIG. 5 shows a top view of the carriage with the router removed.

Referring now to FIGS. 2, 3, 4 and 5, carriage assembly 22 will now be described in detail. FIG. 2 shows a back planar view of carriage assembly 22 with guide rail 18 shown on the right side and guide rail 20 shown on the left side. FIGS. 3 and 4 show a left side view looking from guide rail 18 into carriage assembly 22. In FIG. 3 the carriage assembly 22 is shown in the down position and in FIG. 4 carriage assembly 22 is shown in the up position. FIG. 5 shows a top planar view of carriage assembly 22 looking down from the top of FIG. 3 and with router 16 mostly removed.

Each of the guide rails 18 and 20 are angle brackets having a vertical portion and a horizontal portion, each of which may be, for instance, one and one-half inch on each outer side. Tray assembly 22 is designed to fit between the vertical sides of the two guide rails 18 and 20 and when in the down position the bottom of carriage assembly 22 rides directly on workpiece 14 as seen in FIGS. 2 and 3. A raising and lowering mechanism 56 (which will be described herafter) is included within carriage assembly 22 and can raise carriage assembly 22 above the workpiece 14 surface when it is desired that router 16 not perform any work on workpiece 14. An example of such a situation would be after work has been performed by moving carriage assembly 22 forward across the surface of workpiece 14, it can be raised to be returned to the home position shown in FIG. 1.

Carriage assembly 22 includes a generally U-shaped carriage 42 having a bottom 44 with an opening 46 throught the center thereof. In addition, carriage 42 has a pair of sides 48 and 50, the outer surface of which is guided by the inner side of guide rails 18 and 20. The general shape of bottom 44 of carriage 42 is square and the general shape of base 52 of router 16 is round. Base 52 may be secured to the bottom 44 of carriage 42 by for instance, four bolts 54, which have the bottom ground flush with the bottom surface of bottom 44. Alternatively, bolts 54 may be replaced by a series of clips or other clamping means to hold router 16 against bottom 44 of carriage 42.

The raising and lowering mechanism 56 is positioned above are attached to the sides 48 and 50 of carriage 42. Each of the two halves of mechanism 56 are identical numerical designations used for identical parts of both halves. The raising and lowering mechanism 56 includes a front guide 58, an extension 60, a handle bracket 62, a handle 64 and springs 66. The handle brackets 62 of each of the two sides of mechanisms 56 are connected by an appropriate screw 68 to the handle 64. Mechanism 56 is shown in FIG. 3 in the down position and in FIG. 4 in the up position. From either FIG. 3 or FIG. 4 it is seen that extension 60 is pivotally connected between handle bracket 62 and front guide 58 by respective screws or rivets 72 and 70. The raising and lowering mechanism 56 is designed so that front guide 58 and handle bracket 62 both pivot with respect to carriage side 48 around rivets or bolts 74 and 76 while extension 60 remains generally parallel to the upper surface of side 48. Spring 66 is coupled between spring connector 78 and an extension 79 from rivet 74, thereby coupling the inside of handle bracket 62 to the inside of front guide 58, by spring tension.

When mechanism 56 is in the down position, as shown in FIG. 3, surface 80 of front extension 58 and surface 82 of handle bracket 62 rests above the top of rail 18. This allows carriage assembly 22, including router 16, to be lowered so that the bottom surface of bottom 44 of carriage 42 rests directly on workpiece 14. Thus, when adjusting the depth of the router bit in router 16, only the constant thickness of bottom 44 is considered rather than variations in the thickness of workpiece 14.

When handle 64 is raised to the position shown in FIG. 4, surfaces 84 and 86 rest on the top of rail 18 causing carriage 42 and router 16 to be raised above the surface of workpiece 14.

In FIGS. 4 and 5 carriage clamp 34 is also shown affixed to carriage 42. Bolts 88 extends through sides 48 and 50 of carriage 42 and through a hole 92 in clamp 34 and a hole 94 in sides 48 or 50. Thumb nut 90 is then secured over bolt 88 to secure carriage clamp 34 against rails 18 and 20. Carriage clamp 34, thus, is used to connect carriage 42 in a rigid manner with the guide rails 18 and 20, so that no vertical movement occurs.

Figure 6:
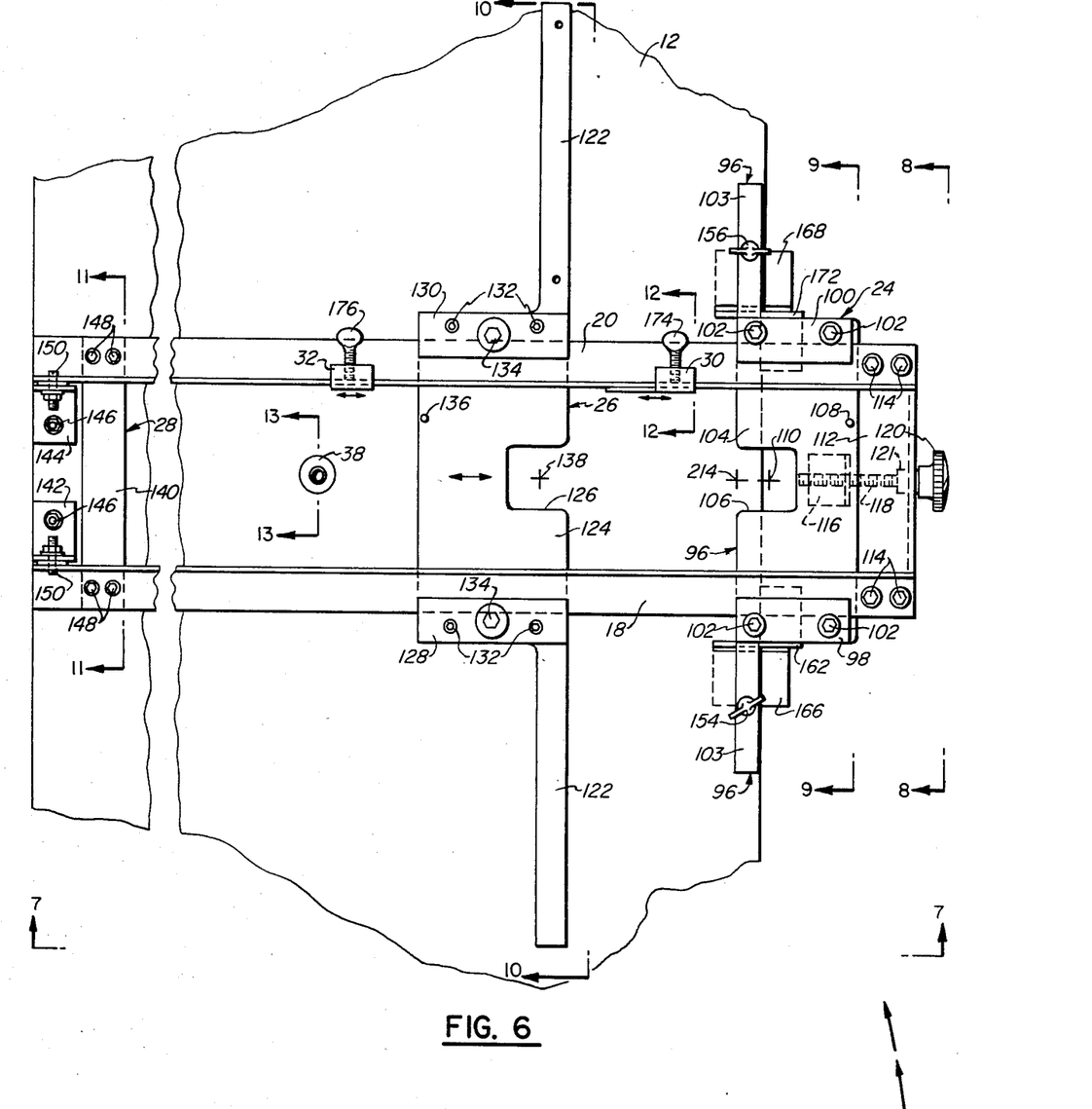
FIG. 6 shows a plan view of the attachment without the carriage.

Referring now to FIGS. 1 and 6, the detail construction of attachment 10 is shown. FIG. 6 shows a plan view, from the top, with workpiece 14, router 16 and router carriage assembly 22 removed. FIGS. 7 through 13 show various cross sections taken in FIG. 6 across individual components thereof, as indicated by the lines 7—7 through 13—13.

Figure 7:
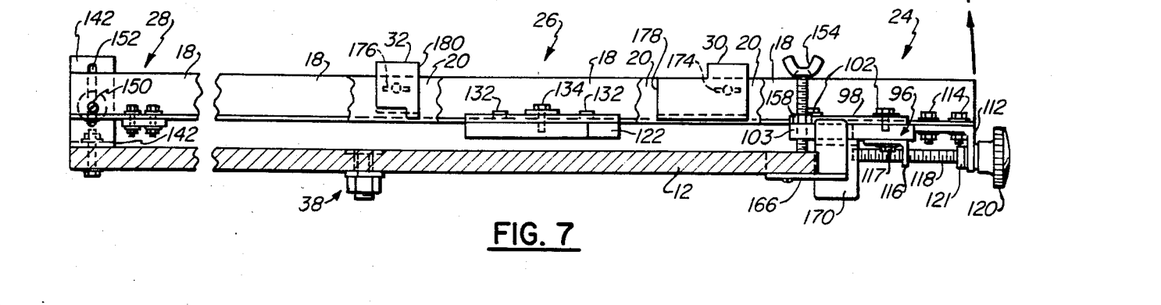
FIG. 7 is a cross section view taken across lines 7—7 of FIG. 6.
Figure 8:
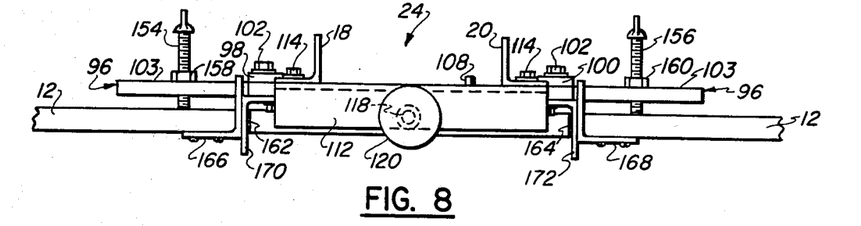
FIG. 8 is a cross section view taken across lines 8—8 of FIG. 6.
Figure 9:
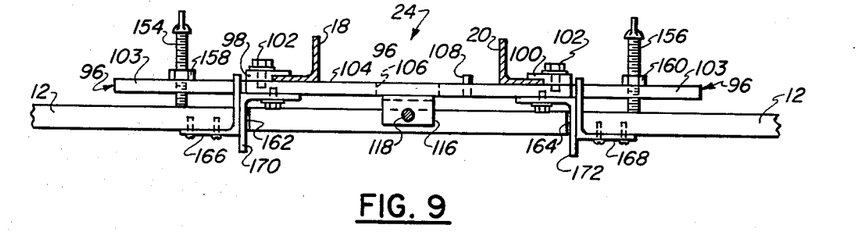
FIG. 9 is a cross section view taken across lines 9—9 of FIG. 6.

The home clamp bar assembly 24 is shown on the right side of FIGS. 6 and 7 and in separate cross sectional views in FIGS. 8 and 9. Assembly 24 includes clamp bar 96 which is secured to rails 18 and 20 by rail securing plates 98 and 100 and bolts 102. Clamp bar 96 includes end extensions 103 beyond rails 18 and 20 and a wider portion 104 between the outer sides of rails 18 and 20. Within wider portion 104 is a generally square cutout 106 on the working side thereof and positioned in the center of wider portion 104. Extending upward from the back side of wider portion 104 is a stop pin 108. When router carriage assembly 22 is moved against stop pin 108, the router bit extending from router 16 through the opening 46 in the bottom of router carriage assembly 22, is positioned directly in the center of cutout 106 at the position indicated by position 110. This position 110 is behind the edge of workpiece 14, which is positioned against the extensions 103 of clamp bar 96.

Front spacing bar 112 is coupled between the two rails 18 and 20 at the extreme home end thereof by bolts 114 to maintain the distance separating the inside surfaces of rails 18 and 20 equal to a slightly greater width of carriage 42. Another angle bracket 116 is affixed to the bottom of wide portion 104 by bolts 117. A bolt 118 and handle 120 assembly is positioned through aligned holes in the vertical portions of front spacing bar 112 and angle bracket 116, the hole in bracket 116 including threads and the hole in front spacing bar 112 including a slip bushing 121 attached to handle 120. Thus, as handle 120 is turned, angle bracket 116 moves closer to or away from front spacing bar 112, depending on the direction of movement of handle 120. As bracket 116 moves, it causes a corresponding movement in clamp bar 96. This movement can be used to secure a workpiece 14, which is placed between clamp bar 96 and adjustable bar assembly 26. The bolt 118 and handle 120 combination could be replaced by a lever or other mechanism which allows only a small movement of clamp bar 96 with respect to rails 18 and 20. Such movement may be in the neighborhood of ⅛th of an inch or less and should be sufficient to either lock a workpiece 14 between the home clamping bar assembly 24 and adjustable clamping bar assembly 26 or to allow it to move freely therebetween.

The remaining components of home clamping bar assembly 24 are used for connecting attachment 10 to table 12 and for adjusting attachment 10 to accomodate different thickness workpieces 14. These components will be described hereafter in conjunction with the description of attachment connector assembly 28.

Figure 10:
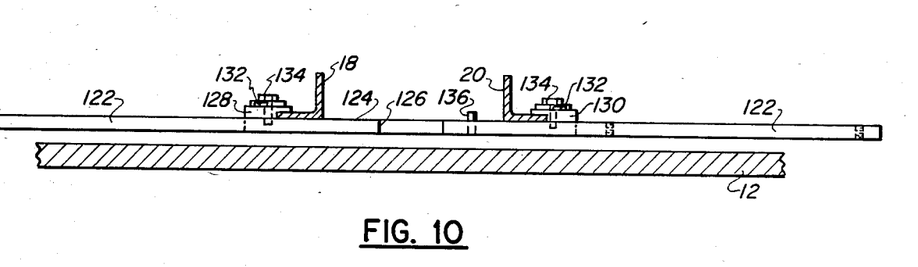
FIG. 10 is a cross section view taken across lines 10—10 of FIG. 6.

Referring now to adjustable bar assembly 26 which is shown in cross section in FIGS. 7 and 10, assembly 26 includes a narrow clamp bar extension 122 in the area generally beyond the edges of rails 18 and 20 and a wider portion 124 between the extensions 122. Generally square cutout portion 126 is provided in wider portion 124 similar to cutout 106 in the home clamping bar assembly 24. Cutout 126 is positioned exactly in the center between the inner sides of rails 18 and 20 and is adapted to receive the router bit after it has finished operating upon the workpiece 14.

The adjustable clamping bar assembly 26 is able to slide along the horizontal portion of rails 18 and 20 by being affixed thereto through the use of the two rail securing plates 128 and 130. Plates 128 and 130 are positioned on the adjustable clamping bar assembly 26 by guide bolts 132 and secured thereto by bolts 134. By loosening bolt 134 assembly 26 can slide from the left to the right or the right to the left along rails 18 and 20 to the desired position. Such position is generally dictated by the width of the workpiece 14 placed between assemblies 24 and 26.

A stop pin 136 extends upward from wide portion 124 and is similar to pin 108 in that it is positioned so that when router carriage assembly 22 is pushed towards assembly 26, is is stopped by pin 136 and the router bit is positioned at position 138 exactly in the middle of cutout 126 and beyond the edge of the workpiece 14.

Figure 11:
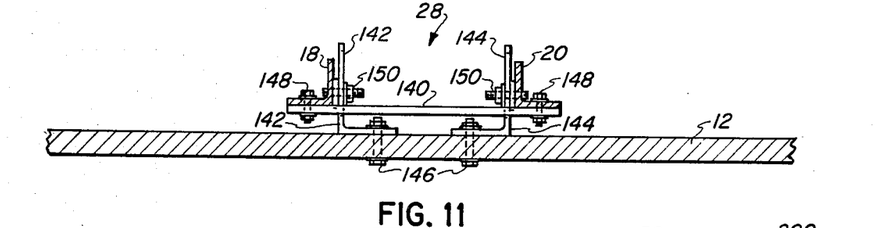
FIG. 11 is a cross section view taken across lines 11—11 of FIG. 6.

The attachment connector assembly 28 is shown in cross section in FIGS. 7 and 11. Assembly 28 includes separation plate 140 separating the inner sides of the two guide rails 18 and 20 by precisely the width of carriage 42. Thus, the front spacing bar 112 and plate 140 provide a constant width guide path for carriage 42 defined by the inner sides of guide rails 18 and 20. In addition, assembly 28 includes a pair of vertical support brackets 142 and 144, which are affixed to worktable 12 by bolts 146. The horizontal portion of each of the guide rails 18 and 20 are connected to separation plate 140 by bolts 148 and the vertical portion of each of the rails 18 and 20 is coupled to support brackets 142 and 144 by bolts 150. The coupling of the vertical portion of rails 18 and 20 to support brackets 142 and 144 is through a slotted opening 152 in brackets 142 and 144. In this manner the height of rails 18 and 20 can be adjusted above the work surface 12 to accomodate different thicknesses of workpieces 14. Slotted opening 152 is best shown in FIGS. 1 and 7.

Referring again to the home clamping bar assembly 24 shown at the right of FIGS. 6 and 7 and in cross section in FIGS. 8 and 9, a pair of adjustable legs 154 and 156 are bolted through extensions 103 of clamp bar 96. Legs 154 and 156 may be adjusted to raise or lower the distance assembly 24 and work table 12 to accomodate different thicknesses of workpieces 14. Generally speaking, the distance determined by adjusting legs 154 and 156 is the same as the distance determined when bolts 150 are secured at the appropriate distance in slotted opening 152. Once legs 154 and 156 are screwed to the proper distance they may be secured by tightening nuts 158 and 160.

In order to accomodate various workpiece 14 thicknesses, attachment 10 can be rotated upward about bolts 150, as indicated by the arrows in FIG. 7. In order to ensure that the rails 18 and 20 of attachment 10 are parallel, a pair of slots 162 and 164 are cut on the home clamping bar side of work table 12. Slots 162 and 164 are positioned with respect to bolts 146 to assure rails 18 and 20 remain parallel when attachment 10 is rotated downward. Guide brackets 166 and 168 are inserted through each of the slots 162 and 164 and secured to the bottom of work table 112. Furthermore, positioning brackets 170 and 172 are secured to the underside of clamp bar 96 and positioned to slide into the slot 162 and 164 as guided by the guide bracket 166 and 168. By properly positioning slots 162 and 164, guide bracket 166 and 168 and positioning bracket 170 and 171 with respect to the vertical support brackets 142 and 144, the true squareness of attachment 10 can be assured.

Figure 12:
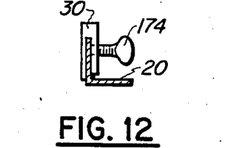
FIG. 12 is a cross section view taken across lines 12—12 of FIG. 6.

Referring now to FIGS. 6, 7 and 12, the details of front stop 30 and back stop 32 will now be described. In Figure 12, a side view of front stop 30 is shown, it being understood that a side view of back stop 32 is identical thereto. As seen in FIG. 12, front stop 30 fits over the vertical portion of rail 20 and can be secured thereto by a thumb screw 174. A similar thumb screw 176 is used to secure back stop 32 to the vertical portion of rail 20. Both front stop 30 and back stop 32 can slide along rail 20 to the desired position and then be secured by thumb screws 174 and 176. Front stop 30 includes a vertical side 178 and back stop 32 includes a vertical side 180. If sides 178 and 180 are secured within the path defined by pins 108 and 136, the positioning of the sides along rail 20 determines the extent that router carriage assembly 22 can be moved across workpiece 14. Further, the fact that sides 178 and 180 are vertical, results in carriage assembly 22 moving vertically up and down as handle 64 is pushed up or down between the positions shown in FIGS. 3 and 4. This is because the sides 182 and 184 of carriage 42 are guided by sides 178 and 180 of stops 30 and 32.

Figure 13:
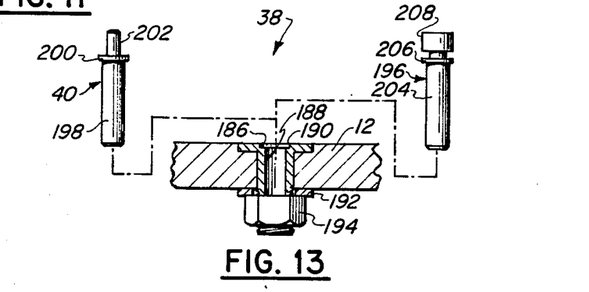
FIG. 13 is a cross section view taken across lines 13—13 of FIG. 6 and shows additionally the pins which can be placed in the opening thereof.

Referring now to FIGS. 6, 7 and 13, pin holder 38 will now be described. Pin holder 38 includes a generally T-shaped pin receiver 186 having a pin opening 188 and a rim opening 190 slightly wider than pin opening 188. Receiver 186 is countersunk into work table 12 so that the top thereof is flush with the top surface of work table 12. The bottom portion of receiver 186 includes threads over which a washer 192 and nut 194 to secure receiver 186 in place. Pin holder 38 may be positioned generally midway between home clamping bar assembly 24 and attachment connector assembly 28. It further should be positioned precisely between rails 18 and 20.

Pin holder 38 is adapted to receiving either a circle cutting pin 49 or a pin routing pin 196. Circle cutting pin 40 includes a shaft 198 and rim 200 both adapted to fit into pin opening 188 and rim opening 190. Above rim 200 is a tip 202 which is adapted to fit into a piece of wood placed thereabove and having an opening therein adapted to receiving tip 202. Pin routing pin 196 is similar to circle pin 40 in that it includes a similar shaft 204 and rim 206 adapted to fit in opening 188 and 190. Above rim 206 however, is a pin routing pin 208 which is circular in shape having a diameter equivalent to a router bit extending from router 16 and positioned directly thereabove.

Referring again to FIG. 1, a pair of rules 210 and 212 are provided. Rule 210 is positioned on the outer vertical side of rail 20 and rule 212 is positioned along the clamp bar 96. Rule 212 may be imbedded in work table 12 so that it does not extend above the surface thereof and interfere with workpiece 14. The "00" positions of rules 210 and 212 should be located at one of either position 110 or position 214 shown in FIG. 6. Position 214 is located at the center of opening 106 and in alignment with the straight edge of workpiece 14 when it is locked against extensions 103 and 122. Position 110 is located at the center of cutout 106 and at the position of the center of the router bit when carriage 42 is positioned against pin 108. The numbers on rule 210 define the position at which the edge 216 of stop 32 should be placed so that whenever edge 216 is set at a position on rule 210 and when router carriage 42 is placed against stop 32, the center of the router bit of router 16 is the set that distance away from position 214. The numbers on rule 212 define the position edge 218 of workpiece 14 is displaced from position 214.

The operation of router attachment 10 will now be described with specific examples of how various types of cuts can be made on workpiece 14 or other types of workpieces which will be described. It should be understood that the following examples are by no means a complete list of all of the different types of cuts which can be made using attachment 10 in conjunction with a router 16.

Referring now to FIG. 1, if it were desired to cut a design on edge 218 of workpiece 14, workpiece 14 would be positioned at the zero position of rule 212. In this position edge 218 is directly in the center between rails 18 and 20 and in alignment with the center of the router bit of router 16. Router 16 would be placed in router carriage assembly 22 in the home position, as shown in FIG. 1 so that the router bit of router 16 is above position 110 shown in FIG. 6. Router 16 would be adjusted vertically so that the bit extending therefrom would be in the desired depth position when handle 64 is placed in the downward position. When handle 64 is placed in the downward position, the bit would be properly positioned and carriage assembly 22 would be moved forward across edge 218 until the router bit center is above the position 138 in cutout 126. Then handle 64 would be raised causing the router bit from router 16 to be raised above the surface of workpiece 14 and carriage assembly 22 would be returned to the position shown in FIG. 1.

If a full mortise cut is desired in workpiece 14, essentially the same procedure would be repeated, except that the edge 218 of workpiece 14 would be positioned along rule 212 at a number defining the distance from edge 218 of the center of the mortise. Thereafter, a proper width bit would be inserted into router 16 and properly depth positioned. Next, handle 64 is lowered and router carriage assembly 22 moved across workpiece 14 until the bit is above position 138. Thereafter, handle 64 is raised and carriage assembly 14 is returned to the home position.

To cut a half blind mortise or a blind mortise, the following procedure is used, assuming that the 00 position of rules 210 and 212 is at position 110. Further, it will be assumed that a ⅜ inch wide half blind mortise will be cut beginning ¼ inch from the front edge and having a center line positioned four inches from the right end of a twenty-four inch long board. First, the workpiece 14 is inserted under rails 18 and 20 until the left end of the workpiece is at the twenty-four inch mark on rule 212, whereby the right end is even with the center of the router bit. Next, the board is moved left until the edge is on the twenty inch mark. It should be noted the half blind mortise is being cut with the board positioned in a reverse direction, that is, the left side position is the right edge of the finished piece. The work piece is then clamped securely between clamping bar assemblies 24 and 26, whereby, the center line of the half blind mortise to be cut is four inches from the finished right end. Front stop 30 is then set so that the vertical edge thereof is at the ⅛ inch mark. This mark is calculated as the distance between position 110 and the edge of assembly 24 (one and one sixteenth inch) plus one half of the diameter of the router bit (three sixteenths of an inch) plus the offset of the half blind mortise (one fourth of an inch). The back stop 32 is then set at or beyond pin 136. Next the router depth is set and the cut is made from front stop 30 to back stop 32 by moving carriage 42 down while it is against front stop 30 and moving carriage 42 forward towards stop 32.

To cut a blind mortise, back stop 30 would have been set so that the vertical edge thereof was secured at the desired stopping point. Note that it is necessary to subtract one half of the router bit diameter.

The same procedures could be used to form decorative designs in work piece 14.

It is also possible to use the set up shown generally in FIG. 1 to form decorative designs in workpiece 14. An appropriate router bit is inserted into router 16 and adjusted to the required depth of cut. Thereafter workpiece 14 can be positioned at a desired point determined by rule 212 and a single groove such as a flutes, vein line, beads, or any other bit design can be cut. The beginning and end of the cuts are controlled by setting stops 30 and 32 as described above. Then, carriage assembly 22 is returned to the up position and moved back to a position against either pin 108 or back stop 32. Next, workpiece 14 can be moved a precise distance as determined by rule 212 and the same procedure can be repeated. By repeating this procedure, a design consisting of parallel router cuts appears within a predetermined area of workpiece 14.

During each of the aforementioned router cuts adjustable bar assembly 26 would have been positioned on guide rails 18 and 20 at a position along rule 210 equivalent to the width or workpiece 14. When edge 218 is properly positioned, the handle 120 would be rotated so that clamp bar 96 and its extensions 103 rests against workpiece 14. Workpiece 14 thus is held firmly in place between clamp bar 96 and extensions 122 of adjustable bar assembly 26.

If it were desired to cut workpiece 14 along its length, workpiece 14 would be positioned between adjustable bar assembly 26 and home clamping bar assembly 24 in the manner previously described. However, handle 120 would be rotated only so far so that workpiece 14 can slide between assemblies 24 and 26. Thereafter, front stop 30 and back stop 32 would be positioned to define the desired point along the width of workpiece 14 for the lengthwise cutting operation. Alternatively, workpiece 14 can be removed from the area and carriage assembly 22 positioned and placed in the down position at the desired point for the cut to occur. Thereafter, carriage clamps 34 could be inserted by securing thumb bolt 90 onto the bolt extending through holes 92 and 94 to lock router carriage assembly 22 in the desired position. Once router 16 is properly positioned at the desired width location of workpiece 14, workpiece 14 is pushed so as to slide between assemblies 24 and 26 while the router bit of router 16 performs the desired lengthwise cut. It should be noted that either an edge design cut can be made by positioning router carriage assembly 22 in one of the cutouts 106 or 126 aligned with edges defined from extensions 103 or 122, or a mortise and decorative cuts can be made along the length of workpiece 14 by positioning the router bit in the required position of the work area.

If it were desired to glue two pieces of wood together, such as two workpieces 14, it would be necessary to make the edges thereof extremely straight and smooth so that the joint is as unnoticeable as possible. This can be done by positioning the router in opening 126 so that approximately ⅛th of an inch of the router bit extends out. This causes ⅛th of an inch to be cut from the edge of workpiece 14 to form the glue joint edge. At the same time, jointing extension 36 is secured onto extension 122 as indicated by the dashed lines in FIG. 1. The width of the vertical portion of extension 36 is also equal to ⅛th of an inch. Thereafter, the router carriage is lowered and the bit depth positioned so that the router bit bottom touches the surface of work table 12. Then, workpiece 14 is moved along extensions 122 and the glue joint surface edge on workpiece 14 is formed. By using jointing extension 36, both the routed and unrouted portion of the edge of workpiece 14 will be up against a solid extension, that is the unrouted edge will be against extension 122 and the routed glue joint surface will be against extension 36. In positioning the router, the carriage clamp 34 could be used or the front stop 30 and back stop 32 could be positioned so that carriage assembly 22 cannot move.

If it were desired to bore a hole in workpiece, 14 front stop 30 and back stop 32 would be positioned across workpiece 14 at the width position where the hole is to be bored and workpiece 14 would be moved along rule 212 to the length position of the hole. Thereafter, handle 64 would be moved downward causing router carriage assembly 22 to move downward. Because of the vertical edges 178 and 180 of front stop 30 and back stop 32, the router bit extending from router 116 would move vertically downward causing a perfect vertical hole to be bored.

Where it is desired to create a circular piece, circle pin 40 is inserted into pin holder 38. A rough cut circle workpiece is made using, for example, a band saw or saber saw and a small hole equivalent in size to the tip 202 of circle pin 40 is made at the center of the rough cut circle. This hole in the rough cut circle is then placed over pin 40 which is inserted into pin holder 38. Adjustable bar assembly 26 is moved to the back or may be removed altogether. The router is positioned away from holder 38 so that the edge of the router bit is the precise distance from the center of pin holder 38 equal to the desired radius of the circle. The router is then lowered in place using stops 30 and 32 and the rough cut circle is rotated about pin 40 and holder 38. As the rough cut circle is rotated, the router cuts a precise circle of the desired dimension. The entire edge of circular workpiece can be shaped to any bit configuration as circle is cut without use of pattern or jigs of any kind. This cannot be done with any attachment jig or fixtures available to the present state of the art. The same procedure could be utilized to cut designs at any position in the circle by adjusting the depth of router 16 and the distance from pin 40 and holder 38. This same procedure can be used to cut inlays at any position into the surface of the circular workpiece. Also, the inlays themselves can be precisely cut.

If it is desired to cut a certain pattern, then pattern pin 196 is inserted into pin holder 38. Thereafter a pattern is created of the desired shape and secured to the bottom side of a workpiece 14. Router carriage assembly 22 is adjusted so that the router bit extending from router 16 is positioned directly over guide 208 of pattern pin 196. Thereafter, the pattern is moved against guide 208 and a cut identical to the pattern is made in the workpiece 14.

In making either the circle cuts or the pattern cuts, it should be noted that any conventional router bit can be used. Thus, that the edges of the circles or the patterns can be either straight or design shaped if desired. Further, expensive bits having ball bearing pilots and the like need not be used since such function is performed by pins 40 and 196.

When attachment 10 is placed on a large work table 12, workpiece 14 is maintained perfectly flat and always perpendicular to the router bit of router 16. This is particularly useful during pin routing, glue jointing or shaping operations and eliminates miscuts due to operator inability to properly support workpiece during cutting operations as frequently happens with conventional woodworking equipment. By appropriately using guide rails 18 and 20, front and back stops 30 and 32 and clamp 34, the various degrees for freedom movement of router 16 can be easily controlled. More specifically, rails 18 and 20 prevent sideways movement of router 16, stops 30 and 32 define or prevent forward and backward movements of router 16 and clamp 34 prevents vertical movement of router 16. With the router held in such a precise position, extremely accurate and precisely positioned cuts can be made. Further, it becomes virtually impossible for the router to be ejected from between rails 18 and 20, or for binds resulting in kickbacks to occur thereby increasing safety.

While the foregoing examples of cuts are merely exemplery, other cuts which can be made by the router attachment assembly 10 are virtually unlimited. For example, other types of cuts which can be made with router 16 when used with attachment 10 include: parting rail mortise (rip and crosscut), dust panel mortise (rip and crosscut), centered four face tenon, half tenon (rabbet), end lap joint, various located lap joint, tee joint, half lap joint, plan dato, drawer dato, housed dato, box corner dato and blind drawer front dato, various dovetail joints, taper routing such as tapered table legs, louvered door slots, mouldings and various types of splines. Further, by using appropriate jigs, cuts at angles can also be made.

What I claim is:

1. A router attachment for controlling the operation of a router on a workpiece, said attachment comprising:
   guide means beneath which said workpiece is positioned;
   support means for holding said router, said support means moving along a path defined by said guide means as said router operates on said workpiece; and
   means for raising said support means above said workpiece when said router is not operating on said workpiece and for lowering said support means in contact with said workpiece when said router is to operate upon said workpiece.

2. The invention according to claim 1 wherein said attachment further includes workpiece positioning means attached to said guide means to position and secure said workpiece to be operated upon by said router.

3. The invention according to claim 2 wherein said workpiece positioning means includes a cutout area to receive said router bit beyond the boundries of said workpiece.

4. The invention according to claim 2 wherein said workpiece positioning means includes a pair of clamping bars attached to said guide means, one of said clamping bars being affixed to said guide means at a position thereon dependent upon the size of said workpiece and the other of said clamping bars being affixed at a home position on said guide means and selectively adjustable to lock said workpiece between said pair of clamping bars.

5. The invention according to claim 4 wherein said workpiece positioning means includes a cutout area to receive said router beyond the boundries of said workpiece.

6. The invention according to claim 4 wherein said one clamping bar is slideably affixed to said guide means.

7. The invention according to claim 2 wherein said guide means includes a pair of rails each having a generally horizontal member and a generally vertical member, said horizontal members extending outward from between said vertical members, said workpiece positioning means being attached to said horizontal members and said carriage means moving between said vertical members.

8. The invention according to claim 7 wherein said workpiece positioning means includes a cutout area to receive said router beyond the boundries of said workpiece.

9. The invention according to claim 8 wherein said workpiece positioning means includes a pair of clamping bars attached to said guide means, one of said clamping bars being affixed to said guide means at a position thereon dependent upon the size of said workpiece and the other of said clamping bars being affixed at a home position on said guide means and selectively adjustable to clamp said workpiece between said pair of clamping bars.

10. The invention according to claim 9 wherein said one clamping bar is slideably affixed to said horizontal members.

11. The invention according to claim 10 wherein said guide means further includes means to fixedly vertically position said rails above said workpiece.

12. The invention according to claim 7 wherein said guide means further includes means to fixedly vertically position said rails above said workpiece.

13. The invention according to claim 1 wherein said guide means includes stop means attachable thereto for defining the bounds of said support means movement and for directing said means for raising and lowering to raise and lower said support means in a direction perpendicular to said workpiece surface.

14. The invention according to claim 13 wherein said stop means includes a pair of stops, each slideably affixed to said guide means, and each having an edge perpendicular to said workpiece surface for directing the raising and lowering of said support means.

15. The invention according to claim 14 wherein said support means includes carriage means having a bottom for supporting said router and for riding on said workpiece during cutting operation and further having sides for being guided by said guide means.

16. The invention according to claim 1 wherein said attachment further includes workpiece guide means for guiding said workpiece.

17. The invention according to claim 1 wherein said attachment is attached to a work table and includes workpiece holding means attached beneath said guide means.

18. The invention according to claim 1 wherein said support means includes carriage means having a bottom for supporting said router and for riding on said workpiece during cutting operation and further having sides for being guided by said guide means.

19. A router attachment attachable to a work table for controlling the operation on a workpiece of a router having a router bit extending therefrom, said workpiece resting on said table, said attachment comprising:
a pair of angle support members;
means for maintaining said support members parallel to one another at a desired distance above said table, said desired distance being greater than the thickness of said workpiece;
carriage means for holding a router and adapted for moving between said support members, said carriage means having a bottom and two sides vertical to said bottom, said sides having outer surfaces parallel to one another and separated by said desired distance;
means for raising and lowering said carriage means between a first position at which said bottom rests on said workpiece and a second position at which said router bit is above said workpiece;
means coupled below said support members for holding said workpiece; and
stop means for defining the limits of movement of said carriage means.

20. The invention according to claim 19 wherein said stop means are affixed to one of said support members and include vertical surfaces for controlling the raising and lowering means to raise and lower said carriage means in a vertical direction.

* * * * *